United States Patent [19]
Klatt

[11] Patent Number: 5,245,425
[45] Date of Patent: Sep. 14, 1993

[54] METHOD AND APPARATUS FOR EQUALIZING THE GAIN OF MULTI-CHANNEL SYSTEMS IN THE PRESENCE OF NOISE

[75] Inventor: Robert W. Klatt, Rancho Palos Verdes, Calif.

[73] Assignee: Hughes Aircraft Company, Los Angeles, Calif.

[21] Appl. No.: 856,600

[22] Filed: Mar. 24, 1992

[51] Int. Cl.$^5$ .............................................. H04N 5/33
[52] U.S. Cl. .................................... 358/113; 358/166; 358/174; 250/252.1
[58] Field of Search ................ 358/113, 160, 166, 167, 358/171, 174, 213.17, 213.15, 213.16; 250/332, 334; 252.1 A

[56] References Cited

U.S. PATENT DOCUMENTS

| | | | |
|---|---|---|---|
| 4,712,010 | 12/1987 | Alm | 250/334 |
| 4,821,337 | 4/1989 | Alm | 358/113 X |
| 4,835,606 | 5/1989 | Peck | 358/113 |
| 4,868,389 | 9/1989 | Moore | 250/334 X |
| 4,948,964 | 8/1990 | Gohlke | 250/252.1 A X |
| 4,963,963 | 10/1990 | Dorman | 358/171 X |
| 5,101,271 | 3/1992 | Andrews et al. | 358/113 |

*Primary Examiner*—Mark R. Powell
*Attorney, Agent, or Firm*—Michael W. Sales; Wanda K. Denson-Low

[57] ABSTRACT

Image restoration methods and systems include a comparison of the outputs of two or more adjacent detector element channels in order to determine the relative responsivities or conversion gains of these channels and to adjust the conversion gains of the two channels to make them substantially equal. These methods include determining the variance for each individual channel's output, and the covariance for each pair of adjacent channel outputs; comparing the values to determine if differences in the variances result from differences in radiant input signals to the channels or from differences in the conversion gains of the channels; and adjusting the conversion gains of the channels as necessary until they are substantially equal.

3 Claims, 1 Drawing Sheet

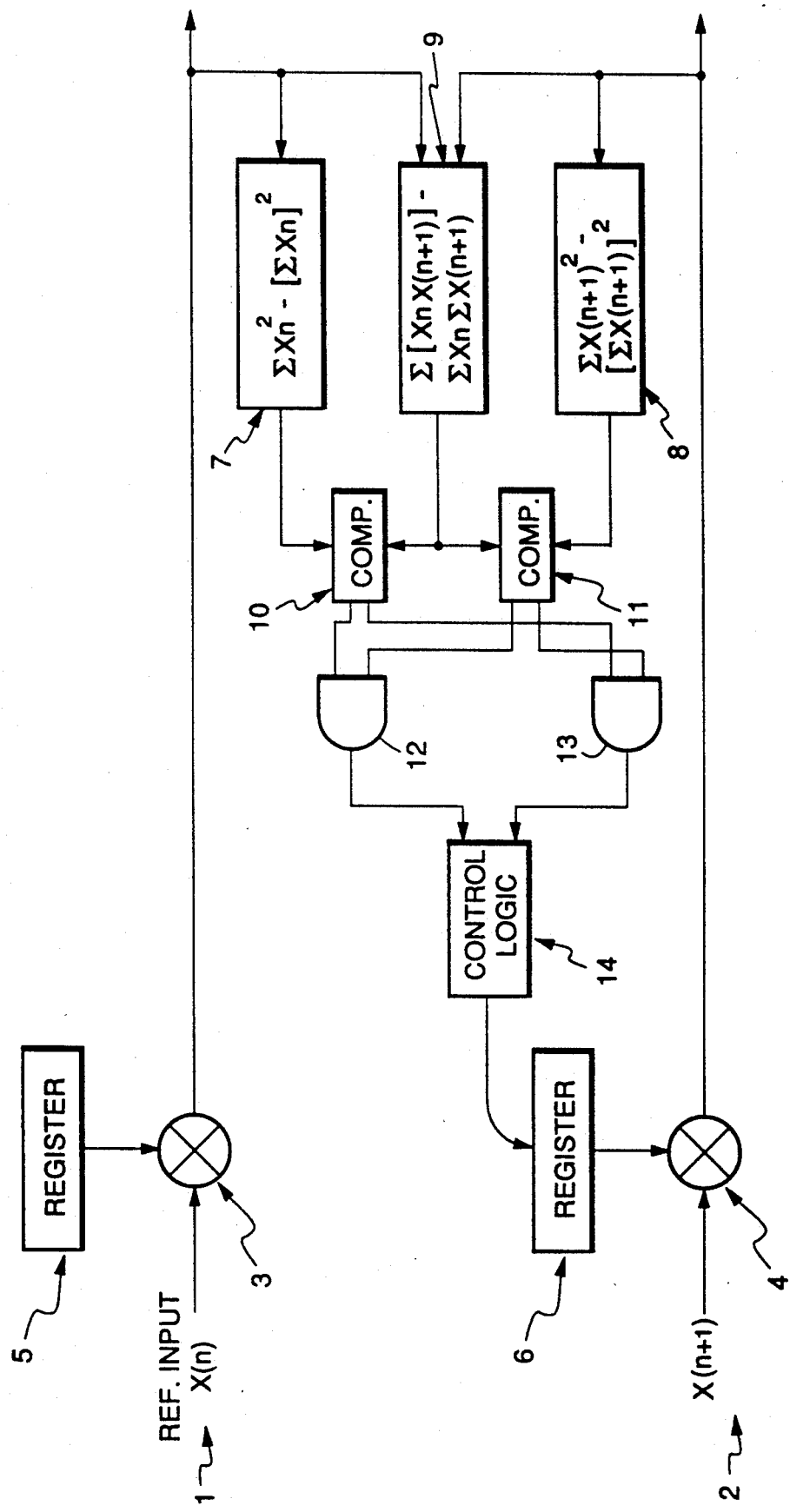

METHOD AND APPARATUS FOR EQUALIZING THE GAIN OF MULTI-CHANNEL SYSTEMS IN THE PRESENCE OF NOISE

BACKGROUND OF THE INVENTION

1. Field of the Invention

This invention relates to systems and methods for improving the quality of video images generated by a forward-looking infrared (FLIR) sensor array. These systems and methods combine the means and method steps of scene-restored systems and methods, but determine the responsivity or conversion gain for each sensor in the system by an autocorrelation/cross-correlation method, and without scanning a constant temperature source.

2. Description of Related Art

In a thermal imaging sensor, it is desirable that object points or pixels of significantly different radiance generate image pixels of significantly different luminance-significant as compared to the background noise level. A corollary requirement is that for good image quality, object pixels of equal radiance should generate image pixels of equal luminance. The ground-sky horizon provides a severe test of the ability of a parallel scan, multi-element sensor to meet these two requirements.

The earliest parallel-scan, thermal imaging sensors had AC- coupled signal processors. AC coupling removes the DC component of the outputs, making the average output of all channels equal, independent of the scene. The average output of each channel, however, represents the average radiance along its object space scan line, and these are not usually equal. If, for example, the scene consists of featureless sky and ground areas separated by the horizon, the average radiance represented by each output is:

$$R(ave) = [A(sky) * R(sky) + A(gnd) * R(gnd)]$$

where A(sky) and A(gnd) are individual weighting factors (whose sum is unity) for each channel, equal to the fractions of the total field-of-view occupied by the sky and ground respectively. If the earth and sky are within the linear range of the signal processor, then the sky and ground signals [S(sky) and S(gnd)] are:

$$S(sky) = G(conv) * [R(sky) - R(ave)] = G(conv) *$$

$$A(gnd) * [R(sky) - R(gnd)]$$

$$S(gnd) = G(conv) * [R(gnd) - R(ave)] = G(conv) *$$

$$A(sky) * [R(sky) - R(gnd)]$$

where G(conv) is the conversion gain (volts or lumens per watt).

Scan lines lying entirely in the sky or ground result in one of the weighting factors being zero. The average outputs for those channels, though equal, then represent two different radiant inputs and violate the minimum requirement. If an AC coupled sensor used for "nap of the earth flight" is oriented with its scan lines parallel to the horizon, the horizon disappears, presenting an obvious problem. When the scan raster is skewed relative to the horizon a different problem arises, and the sensor fails to meet the second requirement. In this case the weighting factors for those channels whose scan lines cross the horizon can have any value between zero and unity. As shown by the equations, the sky and ground signals can then take on all values between zero and the full sky-to-ground difference.

DC restoration provides a partial solution to this problem by using a thermal reference source (TRS) to provide a common reference radiance for all sensor elements. The response of each element to this common input is stored and subtracted from each pixel signal [S(pxl)]. The use of a TRS requires modifying the previous equations, and the average radiance becomes:

$$R(ave) =$$

$$A(sky) * R(sky) + A(gnd) * R(gnd) + A(TRS) * R(TRS).$$

Since each AC coupled pixel signal (including the TRS) is:

$$S(pxl) = G(conv) * [R(pxl) - R(ave)]$$

the corresponding DC restored signal [X(pxl)] is:

$$X(pxl) = \{\text{EQUATION 1}\}$$

$$S(pxl) - S(TRS) = G(conv) *$$

$$\{[R(pxl) - R(AVE)] - [R(TRS) - R(AVE)]\}$$

$$X(pxl) = G(conv) * [R(pxl) - R(TRS)]$$

As shown in Equation 1, the weighting factors do not appear in the new output equation. The DC Restored output signals are strictly proportional to the difference between the image pixel radiance and the TRS radiance and all sky and all ground image pixels of the example appear with equal but different luminances.

A common reference source for all elements also solves a related problem with DC coupled sensors, whose individual outputs are the sum of a signal-independent random offset, and a term proportional to the product of the object pixel radiance and each element's conversion gain. In this case the process may be more properly called Level Equalization, rather than DC Restoration. It eliminates the random variation in raster line luminance which would appear in the image of an uncorrected, DC coupled sensor viewing a uniform temperature scene whose radiance is equal to that of the TRS. Image areas whose radiance were significantly different from the TRS would, however, for both the DC Restored, AC coupled sensor, and the Level Equalized, DC coupled sensor, exhibit random variations in raster line luminance due to inter-element conversion gain variations.

The previous equations implied that the conversion gain [G(conv)] was a constant for all channels. In general, significant inter-channel variations exist, causing output variations which are proportional to the product of the interchannel gain errors and the TRS to scene differential radiance. The effects are most apparent in images combining large areas and large temperature differences. The previous example of the horizon separating uniform-temperature sky and ground areas, but now viewed by an orthogonal raster, provides a good example. Errors of this type must be removed by equalizing the conversion gains, a process commonly called Responsivity Equalization (RE). RE involves multiplying each channel's output by the ratio of a constant (the average responsivity for all the sensor channels, for example) to the individual channel's responsivity. Referring to the previous equations, each conversion gain then becomes equal to, in our example, that of the average responsivity channel.

First generation direct view sensors (such as the common modules) used potentiometers to trim the gain of the parallel channels for equal responsivities. Later first generation sensors, with parallel outputs multiplexed to a single serial output, stored equalization data in read only memory and applied it to the multiplexed video. Adding a second TRS makes automatic Responsivity Equalization possible by continuously adjusting each channel's gain to produce the same signal difference for the two sources. This, however, requires compromising the other sensor requirements or increasing optomechanical complexity. These latter considerations led to the use of Scene-Based RE (SBRE) in some sensors. Simple SBRE acts like an independent Automatic Gain Control (AGC) for each channel, producing equal outputs for all channels. The potential problem with this approach is that the signals are the product of the responsivities and the radiant input, and equal outputs do not guarantee equal responsivities. The assumption is usually made that over a long time interval, all channel inputs are statistically equal, and if the gains converge slowly, the correct results will be obtained.

This invention provides SBRE methods and systems which include a test to determine if differences in the outputs of adjacent channels result from different inputs or from different conversion gains. This makes it possible for the conversion gains to converge rapidly with a high degree of confidence that the conversion gains, and not the output signals, are being equalized.

SUMMARY OF THE INVENTION

This invention relates to image restoration methods and systems called auto-correlation/cross-correlation methods and systems that include means for comparing the outputs of two or more adjacent sensor channels in order to determine the relative responsivities or conversion gains of said channels and adjust said conversion gains to make them substantially equal.

These systems include means for determining the variance for each individual channel's output and the covariance for each pair of adjacent channels' outputs, and means for comparing said values to determine if differences in the variances result from differences in radiant input signals to said channels, or from differences in the conversion gains of said channels.

The systems also include means for controlling the conversion gains of said channels based upon the results of said comparisons with the aim of equalizing said conversion gains.

The systems also include means for sequentially adjusting the gains of a plurality of channels by starting with a reference channel (channel 1, for example) and comparing the outputs of two adjacent channels (one and two, in this case), and using the results of the comparison to adjust the gain of the channel being calibrated (channel 2, in this case). Channel two then becomes the reference channel, outputs two and three are compared, and the results used to adjust channel three. This process continues until all of the plurality of channels are corrected, and then begins again at channels one and two.

In preferred embodiments, the input signals are received from an array of forward looking infrared (FLIR) sensor elements arranged in one or more parallel vertical columns. The thermal image is scanned across the array in the direction perpendicular to the long dimension of the array such that each detector element scans a line of the image. The outputs generated by each element are periodically sampled at time intervals less than or equal to the detector dwell time, i.e. the time it takes an image point to cross the element.

The sampled analog signal is processed and converted to digital form for storage in memory devices. The analog processing may include amplification, filtering, multiplexing, and level and gain correction. The stored digital signals are read out of memory in the sequence necessary to modulate a Cathode Ray Tube (CRT) raster, and processed before being converted to analog video for input to a CRT. The digital processing may include level and gain correction, and contrast and brightness control. The signals may also be processed to generate the error signals and correction coefficients for performing DC Restoration, Level Equalization, and Responsivity or Conversion Gain Equalization.

BRIEF DESCRIPTION OF THE DRAWING

This invention can be better understood by reference to the drawing, which shows a schematic diagram illustrating a preferred embodiment of the Scene Based Responsivity Equalization (SBRE) method and system of this invention.

DESCRIPTION OF THE PREFERRED EMBODIMENT

The drawing shows, in block diagram form, the SBRE function of a thermal imaging sensor in which the SBRE function is performed on the digital video output of the memory, formatted for a standard television display, such that the output of each detector element appears as one continuous sequence of pixel values, at least once during each field. The results and description are equally valid for other embodiments, such as a sensor in which the SBRE function is performed on analog video, but this particular embodiment simplifies the diagram and discussion. The reference video, either channel 1 or the last channel to be equalized, provides input signal 1, and the next channel to be equalized provides input signal 2 to variable gain elements, multipliers 3 and 4. The gains are set by the coefficients in registers 5 and 6. In a sensor using a plurality of elements, all the coefficients would be stored in Random Access Memory (RAM) and the appropriate coefficient for each channel would be read into the register before the beginning of the channel's video input.

The outputs of each channel may be separated into two components: one which appears in both channels and differs only by a multiplicative constant "R", and one which appears only in one channel. For the purpose of this invention, the components which are common to both channels is the signal, and the component appearing in only one channel is noise. The output for the n-th channel has the following form:

$$X(n) = S(n) + N(n)$$

where S(n) is the product of channel n's conversion gain and the common radiant input signal and N(n) is the noise. Assuming we start with channel 1 as the first reference, we can in general denote the reference channel as channel "n", and the channel being calibrated as channel "n+1". Since S(n+1) is the response to a common input by a channel whose conversion gain is "R" times the gain of channel "n":

$$X(n+1) = R*S(n) + N(n+1)$$

The variances would then be:

var(n) = {EQUATION 2}

$$AVE\{X(n)^2 - [AVE(X(n))]^2\} = AVE[S(n)^2] + AVE[N(n)^2]$$

$$var(n+1) = AVE[R^2*S(n)^2] + AVE[N(n+1)^2] \quad \text{\{EQUATION 3\}}$$

and covariance is:

covar[(n),(n+1)] = {EQUATION 4}

$$AVE\{X(n)*X(n+1) - AVE[X(n)]*AVE[X(n+1)]\}$$
$$= AVE[R*S(n)^2]$$

where the averages [AVE()] are taken over one scan line, and the BASIC language conventions are used (* is the multiplication operator and X^2 means X squared). The functions can also be written as:

$$var(n) = AVE[S(n)^2] * \{1 + AVE[N(n)^2]/AVE[S(n)^2]\}$$

and if the Noise-to-Signal Ratio, $\{AVE[N(n)^2]/AVE[S(n)^2]\}$ in the last equation, is written as NSR, then:

$$var(n) = AVE[S(n)^2] * [1 + NSR(n)]$$

$$covar[(n),(n+1)] = AVE[R*S(n)^2]$$
$$= R * AVE[S(n)^2]$$

$$var(n+1) = AVE[R^2 * S(n)^2] * \{1 + NSR(n+1)\}$$
$$= [R^2] * AVE[S(n)^2]$$

Normalizing the above equations by dividing each by the covariance and denoting the normalized versions by capitals [i.e., VAR(n)]:

$$VAR(n) = [1/R] * [1 + NSR(n)]$$

$$COVAR[(n)(n+1)] = 1$$

$$VAR(n+1) = R * [1 + NSR(n+1)]$$

The variances are calculated by signal processing blocks 7 and 8, and the covariance is calculated by block 9. At the end of each line, when all detector element outputs for a single scan or field have been processed, comparators 10 and 11 compare each variance to the covariance, and combine the results by "AND" gates 12 and 13.

Examination of the last equations shows that, since the first factors in the normalized variances are reciprocals, and the second factors are equal to or greater than unity, the three quantities can only be equal if the signals are equal and the noise is zero (infinite SNR).

At low values of NSR (high signal-to-noise ratios), the second factors of the variances approach unity, and the normalized variances are controlled by the ratio "R" of the output signals of the two channels. IF $S(n) > S(n+1)$, then $R < 1$, and there exists some threshold values of NSR below which the outputs of the AND gates indicate:

$$var(n) > covar[(N),(n+1)] > var(n+1)$$

causing, in the implementation shown, control logic 14 to increment the gain coefficient of the channel being calibrated by one LSB (Least Significant Bit), increasing the gain of said channel, and making the conversion gains of the pair of channels being processed converge. This process then continues on the next fields of video until "R" exceeds the reciprocal of $[1+NSR(n+1)]$ resulting in $VAR(n+1) > 1$. At this point, the process proceeds to the next pair of channels, with the last channel calibrated becoming the reference channel, preventing false corrections due to noise. After processing all of the other detector elements, the process would return, but further correction would require lower NSR's, ensuring that the probability of error diminished as the gains converge.

A similar situation exists if $R > 1$ and the NSR's are sufficiently low, resulting in:

$$var(n+1) > covar[(n),(n+1)] > var(n)$$

and decrementing the gain of the channel being calibrated until, in this case, VAR(n) exceeds unity and the process proceeds with the next pair of channels.

The logical structure prevents corrections from being made for any set of conditions other than those described.

An alternate implementation of this function would require taking the difference between the covariance and each variance, rather than making a comparison. Quantitative data would then be available and a correction proportional to the error could be made for more rapid convergence.

What is claimed is:

1. An image restoration method comprising the steps of:
   calculating a plurality of restoration signals to be combined with a plurality of input signals, said input signals including desired image data for video display;
   combining said restoration signals with said input signals to obtain a plurality of desired resultant signals; and
   directing said resultant signals to produce a plurality of video images, said calculating step including the step of comparing the variance value of the input signal from a firstdetector element (n) to the variance value of the input signal from a second, adjacent detector element (n+1) and to the covariance value for the input signals from said first and second detectors elements (n) and (n+1), where the variance value of the input signal from said first detector element (n) is equal to:

$$AVE\{X(n)^2 - [AVE(X(n))]^2\}$$

the variance value of the input signal from the second detector element (n+1) is equal to:

$$AVE[R^2*S(n).2] + AVE[N(n+1)^2],$$

and the covariance value of the input signals from the said first and said second detector elements is equal to:

$$AVE\{X(n)*X(n+1) - AVE[X(n)]*AVE[X(n+1)]\}$$

where $X(n)$ and $X(n+1)$ are the outputs of the first and second detector elements, respectively, from a single scan of a scene by said first and said second detector elements, and then adjusting the gain of said second detector element, as indicated by the relative values of the two variances and the covariance, until the variance of the input signal from said second detector element is substantially equal to the variance value of the input signal from said first detector element.

2. An image restoration system comprising a plurality of signal detector elements;
   means for determining the appropriate signal output from each of said detector elements; and
   means for generating the desired output signals from each of said detector elements;
   said generating means including means for calculating a plurality of restoration signals to be combined with a plurality of input signals, said input signals including the desired image data for a video display;
   means for combining the restoration signals with said input signals to obtain a plurality of desired resultant signals; and
   means for directing the resultant signals to produce a plurality of video images, said calculating means including means for comparing the variance value of the input signal from a first detector element (n) to the variance value of the input signal from a second, adjacent detector element $(n+1)$ and to the covariance value for the input signals from said first and second detector elements (n) and $(n+1)$, where the variance value of the input signal from said first detector element (n) is equal to:

$$AVE\{X(n)^2 - [AVE(X(n))]^2\}$$

the variance value of the input signal from the second detector element $(n+1)$ is equal to:

$$AVE[R^2 \cdot S(n)^2] + AVE[N(n+1)^2],$$

and the covariance value of the input signals from the said first and said second detector elements is equal to:

$$AVE\{X(n) \cdot X(n+1) - AVE[X(n)] \cdot AVE[X(n+1)]\}$$

where $X(n)$ and $X(n+1)$ are the outputs of the first and second detector elements, respectively, from a single scan of a scene by said first and said second detector elements, and then increasing the gain of said second detector element, as necessary, until the variance of the input signal from said second detector element is greater than said covariance value, and said covariance value is greater than the variance value of the input signal from said first detector element.

3. The system of claim 2 further comprising:
   a forward-looking infrared sensor array that includes said plurality of detector elements.

* * * * *